United States Patent [19]
Ushirozawa

[11] Patent Number: 5,796,505
[45] Date of Patent: Aug. 18, 1998

[54] LIGHTWAVE TRANSMITTER

[75] Inventor: Mizuyuki Ushirozawa, Tokyo, Japan

[73] Assignee: NEC Corporation, Tokyo, Japan

[21] Appl. No.: 566,946

[22] Filed: Dec. 4, 1995

[30] Foreign Application Priority Data

Dec. 2, 1994 [JP] Japan ................. 6-299311

[51] Int. Cl.$^6$ ................. H04B 10/00
[52] U.S. Cl. ................. 359/160; 359/134; 359/110; 359/341
[58] Field of Search ................. 359/134, 110, 359/160, 158, 180, 341

[56] References Cited

U.S. PATENT DOCUMENTS 5,365,368  11/1994  Hsu et al. ................. 359/134

FOREIGN PATENT DOCUMENTS 0582406  2/1994  European Pat. Off. ................. 359/160

4-289829  10/1992  Japan.

*Primary Examiner*—Kinfe-Michael Negash
*Attorney, Agent, or Firm*—Scully, Scott, Murphy & Presser

[57] ABSTRACT

It is the object of the invention to provide a lightwave transmitter, in which the lightwave surge is not generated, as soon as the input lightwave signal is down momentarily. A signal down detecting circuit monitors a data signal and a clock signal, and generates a down detecting signal, as soon as one down of the data and clock signals is detected, and till a predetermined period of time, which is longer than a mean life time of carriers on excitation level of Er-doped optical fiber, has passed. While the down detecting signal is supplied, an output power control circuit stops the supply of a pumping light power. Moreover, while the down detecting signal is generated, the supply of the lightwave signal by the electrical to lightwave signal converter is ceased. As mentioned in the above, since the amplification of the light power signal is restarted after the energy of carriers sufficiently decreased by spontaneous emissions of carriers, the light wave surge is not generated.

7 Claims, 2 Drawing Sheets

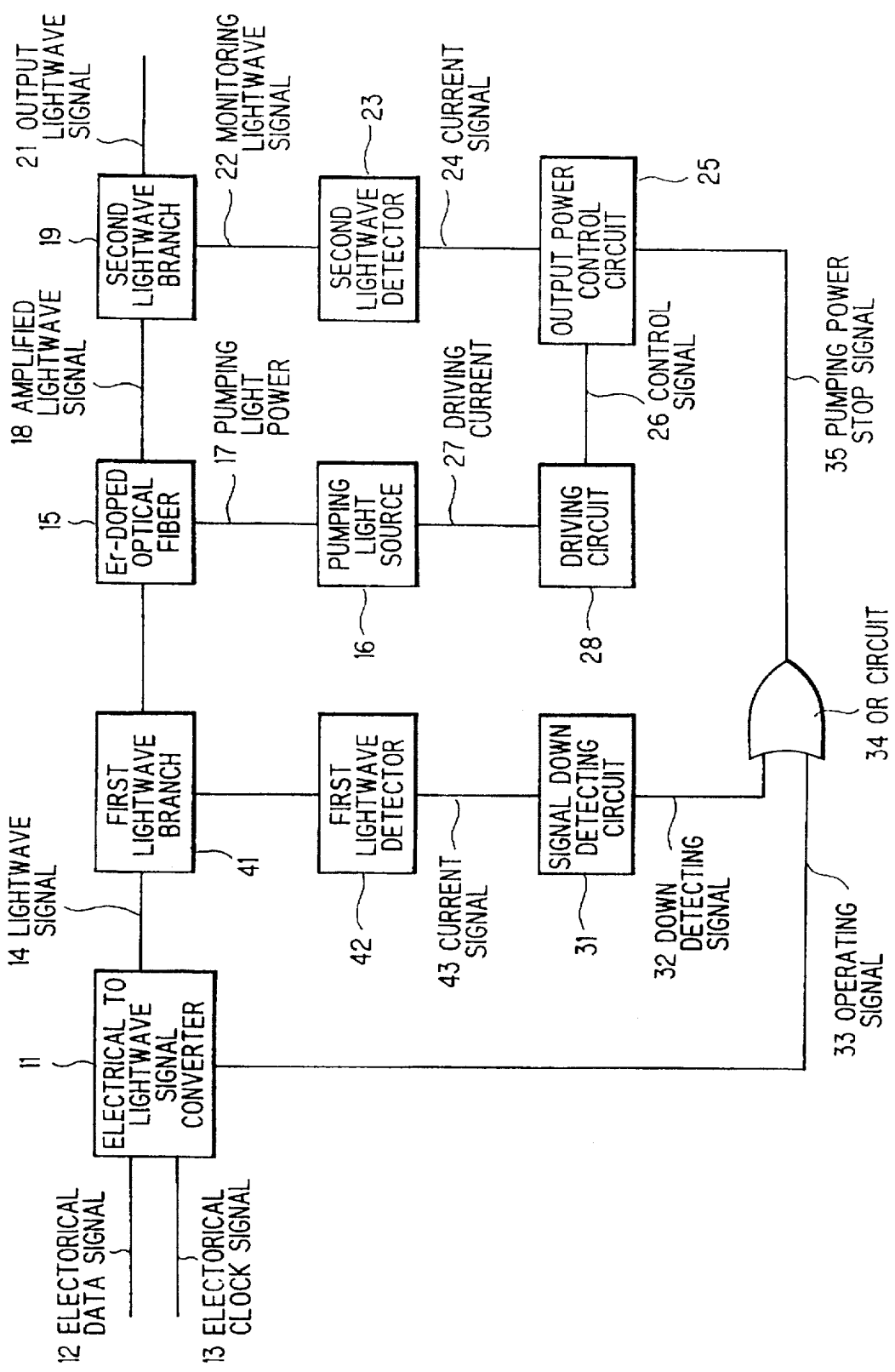

LIGHTWAVE TRANSMITTER

FIELD OF THE INVENTION

The invention relates to a lightwave transmitter for supplying a lightwave signal, which is generated by converting an electrical signal into a lightwave signal, and especially to a lightwave transmitter, which interrupts the function of a direct lightwave amplifier for a predetermined period of time, when the converted lightwave signal is interrupted.

BACKGROUND OF THE INVENTION

In a conventional lightwave transmitter, an electrical signal is converted into a lightwave signal by a laser diode, and the lightwave signal is amplified by a lightwave direct amplifier comprising a rare-earth element doped optical fiber, which is supplied with the pumping light power in which carries are pumped onto excitation levels. When the lightwave signal is introduced to the rare-earth element doped optical fiber, induced emission arises therein, and the lightwave signal is amplified. The gain of the direct lightwave amplifier is controlled by the intensity of the pumping light power supplied thereto.

Japanese Patent Kokai 4-289829 discloses a direct lightwave amplifier with low noise and high gain, by supplying two pumping light powers with different wavelengths to a rare-earth element doped optical fiber. In a case where the wavelength of a pumping light power is 1.48 µm, a lightwave with a high power can be obtained by the aid of the semiconductor laser, which serves as a pumping light source. In a case where the wavelength of a pumping light power is 0.98 µm, a light power obtained is not so large, but noise level thereof is low. Then, a light power with low noise level and higher power level can be obtained by combining two pumping light powers.

In such a lightwave transmitter comprising a lightwave direct amplifier, the lightwave signal having been amplified is divided into two portions by a lightwave branch. One portion serves as an output lightwave signal and another portion serves as a monitoring lightwave signal. The average power of the output lightwave signal is controlled so as to maintain a constant predetermined value, by controlling the pumping light power supplied to the lightwave direct amplifier, in accordance with the monitoring light power. Accordingly, when the lightwave supplied to the direct lightwave amplifier is down, the pumping light power supplied to the direct optical amplifier is so controlled as to increase. In other words, although the lightwave signal supplied to the input port of the lightwave direct amplifier is zero, a large pumping power is supplied thereto. Then, in a conventional lightwave transmitter using the direct lightwave amplifier, on detecting that the input lightwave is interrupted, the supply of the pumping power to the lightwave direct amplifier ceases in most cases. Then, it is the general way that, when the interruption of the lightwave signal to be transmitted is detected, the supply of the pumping light power from the pumping light source is stopped. When the lightwave signal is again generated in the laser diode, the supply of the pumping light power is restarted.

When the lightwave signal is interrupted, a certain interval of time is required till this accident is detected. Thus, it is impossible to stop the supply of the pumping light power to the rare-earth element doped optical fiber as soon as the aforementioned accident happens. Accordingly, the pumping light power continues to be supplied to the rare-earth element doped optical fiber despite interruption of the lightwave signal, and carriers on excited levels of the rare-earth doped fiber are excessively increased. When the supply of the pumping light power is stopped, the energy of the excited carriers is spontaneously emitted and decreases down to a small value within several tens milliseconds, if the input signal lightwave is not supplied. The period of time, for which the energy of the carrier decreases to a small value, is called a mean life time. Then, if the period of time for which the lightwave signal is down, is longer than the mean life time of the carrier, then the carriers on excited excitation levels never excessively increase, when the supply of the lightwave signal is restarted. However, when the period of time in which the input lightwave is down, is extremely short, in other words, when the lightwave signal is restored within a short period of time, which time being shorter than the mean life time of carriers, the amplification of the lightwave is restarted on the condition that the excited carriers are excessive. Accordingly, when the lightwave signal is interrupted momentarily, the gain of the rare-earth element doped fiber becomes excessively high temporarily, and a lightwave signal is saturated. A lightwave surge arises during the above mentioned condition.

SUMMARY OF THE INVENTION

Accordingly, it is an object of the invention to provide a lightwave transmitter, in which a lightwave surge does not arise, even when the interruption of a lightwave surge is momentary.

It is a further object of the invention to provide a lightwave transmitter, in which a lightwave surge does not arise, when the interruption of the signal is considerably long.

It is a still a further object of the invention to provide a lightwave transmitter, in which a lightwave surge does not arise and the loss of the lightwave signal is small.

According to the first feature of the invention, a lightwave transmitter according to the invention comprises:

an electrical to lightwave signal converter, which converts a supplied electrical signal into a lightwave signal, a rare-earth element doped optical fiber, which amplifies a lightwave signal supplied from the electrical to lightwave signal converter, a pumping light source, which supplies a pumping light power to the rare-earth element doped optical fiber, interruption detecting means, which detects an interruption condition of the lightwave signal supplied to the rare-earth element doped optical fiber, means for temporarily stopping a generation of the lightwave signal by the electrical to lightwave signal converter, for a predetermined period of time beginning from detection of the interruption condition until the predetermined period of time has passed, and means for temporarily stopping the pumping light power for the predetermined period of time beginning from the detection of the interruption condition until the predetermined period of time has passed.

According to the second feature of the invention, a lightwave transmitter according to the invention comprises:

an electrical to lightwave signal converter, which converts a supplied electrical signal into a lightwave signal, a rare-earth element doped optical fiber, which amplifies a lightwave signal supplied from the electrical to lightwave signal converter, a pumping light source, which supplies a pumping light power to the rare-earth element doped optical fiber, interruption detecting means, which detects a down of a lightwave signal supplied to the rare-earth element doped optical fiber, means for stopping the pumping light power upon detection of said interruption condition, means for temporarily stopping a generation of the lightwave signal by the electrical to lightwave signal converter for a predetermined period of time beginning from detection of the interruption condition until the predetermined period of time has passed, and means for temporarily stopping the pumping light power for the predetermined period of time beginning from the detection of the interruption condition until the predetermined period of time has passed.

According to the third feature of the invention, a lightwave transmitter according to the invention comprises:

an electrical to lightwave signal converter, which converts a supplied electrical signal into a lightwave signal, a rare-earth element doped optical fiber, which amplifies a lightwave signal supplied from the electrical to lightwave signal converter, a pumping light source, which supplies a pumping light power to the rare-earth element doped optical fiber, interruption detecting means, which detects an interruption condition of the electrical signal, pumping light power stop means which stops the pumping light power during the interruption condition, means for temporarily stopping a generation of the lightwave signal by the electrical to lightwave signal converter for a predetermined period of time beginning from detection of the interruption condition until the predetermined period of time has passed, and means for temporarily stopping the pumping light power for the predetermined period of time beginning from the detection of the interruption condition until said predetermined period of time has passed.

BRIEF DESCRIPTION OF THE DRAWINGS

The invention will be explained in more detail in conjunction with the appended drawings, wherein:

FIG. 2 is a block diagram, which shows an outline of a structure of a second preferred embodiment of the invention.

DESCRIPTION OF THE PREFERRED EMBODIMENTS

Figure 1:
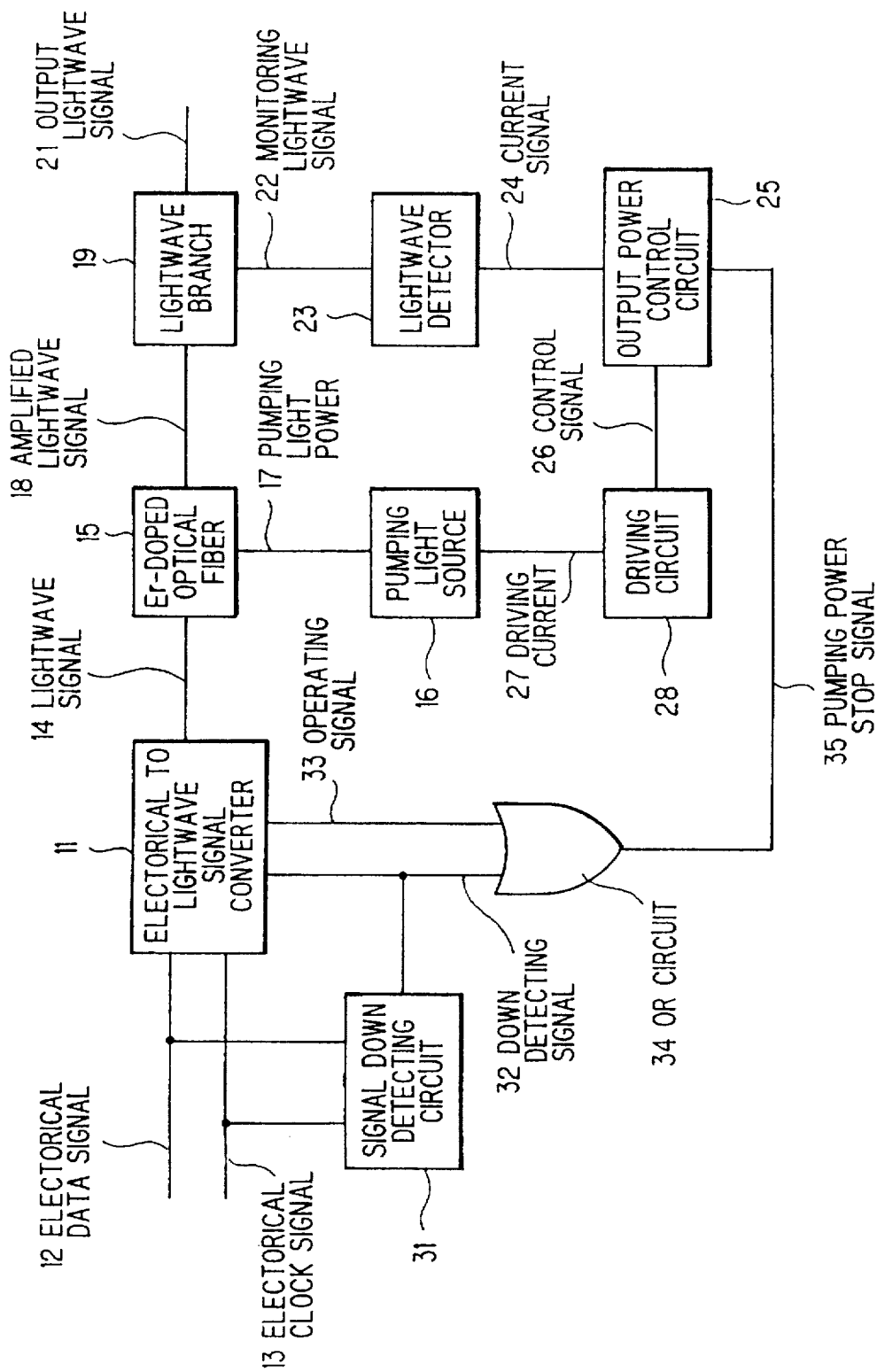
FIG. 1 is a block diagram, which shows an outline of a structure of a first preferred embodiment of the invention.

Hereafter, preferred embodiments of the invention will be explained in detail referring to the appended drawings.

FIG. 1 is a block diagram representing the outline of the structure of the first preferred invention. An electrical to lightwave signal converter 11 is supplied with an electrical data signal 12, which is to be converted to a lightwave signal 14, and the electrical clock signal 13. The lightwave signal 14, which is generated by an electrical to lightwave signal convertor 11, is supplied to an erbium-doped optical fiber (Er-doped optical fiber, hereinafter) 15. The Er-doped optical fiber 15 is supplied with a pumping light power 17, generated in a pumping light source 17, where the lightwave signal 14 is amplified in accordance with the pumping lightwave power 17. An amplified lightwave signal 18 thus obtained is divided into two portions by a lightwave branch 19. A main portion of these two becomes the output lightwave signal 21 of the lightwave transmitter. Another portion of the lightwave serves as a monitoring lightwave signal 22 and is supplied to a lightwave detector 23. The lightwave detector 23 generates a current signal 24 corresponding to the intensity of the monitoring lightwave 22. In the structure shown in FIG. 1, a pin-photo diode is used in the lightwave detector 23.

The current signal 24 generated by the light detector 23 is led to an output power control circuit 25. The output control circuit 25 converts the current signal 24 into a voltage signal, compares a voltage signal thus obtained with a predetermined standard voltage and generates a control signal 26, which corresponds to a difference between the two aforementioned voltages. A control signal 26 is supplied to a driving circuit 28, which supplies a driving current 27 to a pumping light source 16. The pumping light power 17, which is supplied by the pumping light source 16, is controlled by the driving current 27, which corresponds to the control signal 26. Being based on the intensity of the monitoring lightwave signal 22, the intensity of the driving current supplied to the pumping light source 16 is so controlled that the average value of the optical power derived from the Er-doped optical fiber 15 becomes constant.

Both the electrical data signal 12 and the electrical clock signal 13 are supplied to a signal interruption detection means 31, hereinafter referred to as a signal down detecting circuit 31. The signal down detecting circuit 31 generates a down detecting signal 32, when it detects the interruption of at least one of the electrical data and clock signals. Moreover, an interrupt detecting signal 32, hereinafter referred to as a down detecting signal 32 is still generated, even when the interruption condition of the signals is alleviated before the predetermined period of time, which is longer than the mean life time of carriers, has passed. In this embodiment, the aforementioned period of time is set 20 mS.

The electrical data signal 12 supplied to the signal down detecting circuit 31 is a binary signal with a certain bit rate, and the down of the signal is discriminated by the fact that the signal is invariant through a certain period of time. Also in the case of the electrical clock signal 13, the interruption of the signal is discriminated by the fact that the signal is invariant through a certain period of time. A discriminating circuit comprises a one shot multivibrator (not shown), the width of an output pulse of which is longer than the bit rate of the data signal 12 or the period of the electrical clock signal, and the electrical data signal 12 or the electrical clock signal 13 serves as a trigger signal. When the electrical data signal 12 or the electrical clock signal 13 is interrupted, the one shot multivibrator cannot be again triggered while the pulse signal is being supplied, and the output of the multivibrator ceases, and thereby the interruption of the signal can be detected. Moreover, the pulse signal, a pulse width of which is longer than the mean life time of the excited carrier, is generated by another one shot multivibrator (not shown), which uses the output signal of the aforementioned one shot multivibrator as a triggering signal. The signal down detecting circuit 31 derives the logical sum of these signals, and generates the down detecting signal 32 while the data signal or clock signal 13 is down, and for at least 20 mS, when the signal is restored momentarily.

An electrical to lightwave signal convertor 11 generates a predetermined operating signal 33, while said signal converter 11 generates an lightwave signal. An OR circuit 34 derives the logical sum of the operating signal 33 and the down detecting signal 32, and generates a pumping light power stop signal 35 in case where the down detecting signal 32 is generated and in case where the operating signal 33 is not generated. The pumping power stop signal 35 is supplied to the output power control circuit 25, and the driving circuit 28 is so controlled that a pumping light power 17 is not supplied to the Er-doped optical fiber 15, while the pumping power stop signal 35 is supplied to the output power control circuit 25.

Now suppose that the data signal 12 is momentarily interrupted for 50 µS. The down detecting circuit 31 generates the down detecting signal 32 for 20 mS upon detecting it. Accordingly, even if the data signal 12 is restored soon after, the electrical to lightwave signal converter 11 dose not generate the lightwave signal, while the down detecting signal 32 is generated. Moreover, in the output power control circuit 25, the supply of the pumping light power is stopped, while the down detecting signal 32 is generated. The output power control circuit 25 stops the supply of the pumping light power 17 to the Er-doped optical fiber 15 while the down detecting is generated. Accordingly, the excited carriers of the Er-doped optical fiber 15 lose their energies by spontaneous emissions, and drop down to the bottom levels. After the period of the down detecting signal 32 has passed, the electrical to lightwave converter 11 begins to generate the lightwave signal 14 in accordance with the data signal 12. At the same time, the pumping light power is supplied to the Er-doped optical fiber 15. Since the pumping light power 17 has been interrupted for 20 mS, carriers of excitation levels of the optical fiber 15 are not excessive, when the generation of the lightwave signal 14 is restarted in the electrical to lightwave signal converter 11. Then, even when a momentary interruption happens, the output light power of the Er-doped optical fiber 15 dose not cause a lightwave surge.

When the clock signal is interrupted, a similar procedure is possible. In a case where only the clock signal 13 is down, the down detecting signal 32 is generated by the signal down detecting circuit 31, and thereby the lightwave signal 14 is not supplied from the electrical to lightwave converting circuit 11. Consequently, the lightwave signal involving errors, which is not regulated by the correct clock signal, is not generated.

Even in a case where the data signal 12 and the clock signal 13 are not down or, the lightwave signal 14 may not be generated on account of an accident to the electrical to lightwave converter 11, for example. In such a case, since the operating signal 33 is not generated, the pumping power stop signal 35 is supplied to the output power control circuit 25 via the OR circuit 34, and the supply of the pumping power is stopped. Accordingly, in a case where an accident happens to the electrical lightwave converter 11, the supply of the pumping power is stopped, and carriers on excited energy levels do not become excessive.

In the aforementioned embodiment, the signal down detecting circuit 31 monitors the interruption of the data signal 12 and the clock signal 13. However, there is another way, in which the lightwave signal 14, supplied by the electrical to lightwave signal converter 11, is monitored.

FIG. 2 shows the outline of the structure of a lightwave transmitter, which is modified in such a way described in the above. The components with the same functions as those shown in FIG. 1 are denoted by the same reference numerals, and the description on them will be abbreviated. The lightwave signal 14 supplied by the electrical to lightwave signal converter 11 is branched into two portions by a first lightwave branch 41. One portion is supplied to the Er-doped optical fiber 15, and another portion to a first lightwave detector 42. The first lightwave detector 42 generates a current signal 43 in accordance with a lightwave supplied thereto, and the signal current signal 43 is supplied to a signal down detecting circuit 31. The signal down detecting circuit 31 generates a down detecting signal 32, on detecting that the current signal 43 is invariant for a period of time, which is longer than a certain value. As in the case of the previous embodiments, the down detecting signal 32 is generated while the lightwave signal is down or interrupted, and for 20 mS since the interruption of signal is detected, when the lightwave is restored momentarily. As mentioned in the above, a similar procedure is possible by monitoring the output lightwave of the electrical to lightwave signal converter 11.

In the first preferred embodiment and its modified embodiment described in the above, the period of time, for which the down detecting signal is generated, is 20 mS, but this period of time is never restricted to this value, and should be longer than the mean life time of the carrier. The mean life time of the carrier is varied according to the kind of a rare-earth element doped in the optical fiber, and the aforementioned period of time can be suitably determined corresponding to the kind of the rare-earth element. For example, neodymium (Nd) or praseodymium (Pr) can be enumerated as other element, which may be doped in the optical fiber. Moreover, in the aforementioned embodiments, the signal down detecting circuit is composed of the one shot multivibrator, but the other circuit may be used, if it can detect the down of the data or clock signal. Still more, in the first preferred embodiment and its modification, the output lightwave signal of the Er-doped optical fiber is monitored and the pumping light power is so controlled that the average value of the output lightwave signal of the Er-doped optical fiber is constant, but the other way of the control may be adopted.

According to the invention defined in claim 1, the generation of the lightwave signal in the electrical to lightwave signal converter and the supply of the pumping light power are stopped, till the predetermined period of time has passed after the lightwave signal is interrupted. When the aforementioned period of time has passed, the carriers on excited levels can be decreased, and thereby the generation of the lightwave surge is largely decreased, in a case where the amplification of the lightwave signal is restarted.

Moreover, according to the invention defined in claim 3, the generation of the lightwave signal in the electrical to lightwave signal converter and the supply of the pumping light power are stopped, till the predetermined period of time has passed beginning from the interruption of the lightwave signal. When the aforementioned period of time has passed, carriers on excitation levels can be decreased, and thereby the generation of the lightwave surge is largely decreased, in a case where the amplification of the lightwave signal is restarted. Still more, since the pumping light power supplied to the rare-earth element doped optical fiber is stopped, while the lightwave signal supplied to the rare-earth element doped optical fiber is down, carriers on excitation levels will not be excess again, before the lightwave signal is supplied. Accordingly, the generation of the lightwave surge is largely decreased, when the amplification of the lightwave signal is restarted, being independent of the period of time, when the lightwave signal is down or interrupted.

According to the invention defined in claim 5, since the down of the signal is detected through the down of the electrical signal, the lightwave signal generated in the electrical to lightwave signal converter is supplied to the rare-earth element doped optical fiber with small loss, as compared with the case where the interruption of the signal is detected by monitoring the lightwave signal itself to be supplied to the rare-earth element optical fiber, and thereby the output power of the lightwave transmitter can be increased.

According to the invention defined in claim 6, even in a case where an interruption of at least one of the data and clock signals is detected, both the supply of the pumping light power and the generation of the lightwave signal in the lightwave to electrical signal converter are stopped. Thereby, for example, the situation where only the clock signal is down or interrupted, and the data signal involving error, which is not properly sampled by the correct clock signal is transmitted, can be avoided. Moreover, the structure of the circuit can be simplified, as compared with the case that the down or interruption of the clock signal is detected by monitoring the lightwave signal.

According to the invention defined in claim 2, the period of time, for which the supply of the pumping light power and the generation of the lightwave signal in the electrical to lightwave signal converter are stopped, as soon as the or interruption of the lightwave signal is detected, is set to be longer than the mean life time of carriers on the excitation level. Accordingly, the carriers on the excitation level are not excessive, after the aforementioned period of time has passed, and then the generation of the lightwave surge can be surely avoided, when the amplification of the lightwave signal is restarted.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A lightwave transmitter comprising:

an electrical to lightwave signal converter which converts a supplied electrical signal into a lightwave signal, a rare-earth element doped optical fiber which amplifies said lightwave signal, a pumping light source which supplies a pumping light power to said rare-earth element doped optical fiber, interruption detecting means which detects an interruption condition of said lightwave signal, means for temporarily stopping a generation of said lightwave signal by said electrical to lightwave signal converter for a predetermined period of time beginning from detection of said interruption condition until said predetermined period of time has passed, and means for temporarily stopping said pumping light power for said predetermined period of time beginning from said detection of said interruption condition until said predetermined period of time has passed.

2. A lightwave transmitter according to claim 1, wherein:

said predetermined period of time is longer than a mean life time of carriers on excitation levels of said rare-earth element doped optical fiber.

3. A lightwave transmitter comprising:

an electrical to lightwave signal converter which converts a supplied electrical signal into a lightwave signal, a rare-earth element doped optical fiber which amplifies said lightwave signal, a pumping light source which supplies a pumping light power to said rare-earth element doped optical fiber, interruption detecting means which detects an interruption condition of said lightwave signal, means for stopping said pumping light power upon detection of said interruption condition, means for temporarily stopping a generation of said lightwave signal by said electrical to lightwave signal converter for a predetermined period of time beginning from detection of said interruption condition until said predetermined period of time has passed, and means for temporarily stopping said pumping light power for said predetermined period of time beginning from said detection of said interruption condition until said predetermined period of time has passed.

4. A lightwave transmitter according to claim 3, wherein:

said predetermined period of time is longer than a mean life time of carriers on excitation levels of said rare-earth element doped optical fiber.

5. A lightwave transmitter comprising:

an electrical to lightwave signal converter which converts a supplied electrical signal into a lightwave signal, a rare-earth element doped optical fiber which amplifies said lightwave signal, a pumping light source which supplies a pumping light power to said rare-earth element doped optical fiber, interruption detecting means which detects an interruption condition of said electrical signal, pumping light power stop means which stops said pumping light power during said interruption condition, means for temporarily stopping a generation of said lightwave signal by said electrical to lightwave signal converter for a predetermined period of time beginning from detection of said interruption condition until said predetermined period of time has passed, and means for temporarily stopping said pumping light power for said predetermined period of time beginning from said detection of said interruption condition until said predetermined period of time has passed.

6. A lightwave transmitter according to claim 5, wherein:

said electrical signal is composed of a data signal representing a data to be transmitted therefrom, and a clock signal, which serves as a standard of timing for sampling said data signal, and said down detecting means detects at least one down of said data and clock signals.

7. A lightwave transmitter according to claim 5, wherein:

said predetermined period of time is longer than a mean life time of carriers on excitation levels of said rare-earth element doped optical fiber.

* * * * *

UNITED STATES PATENT AND TRADEMARK OFFICE
CERTIFICATE OF CORRECTION

PATENT NO. : 5,796,505
DATED : August 18, 1998
INVENTOR(S) : Mizuyuki Ushirozawa It is certified that error appears in the above-identified patent and that said Letters Patent is hereby corrected as shown below:

Column 1, Line 17: "carries" should read --carriers--

Column 1, Line 46: "down" should read --interrupted--

Column 3, Line 1 and 2: "a down of a" should read --an interruption condition of the--

Column 5, Line 45: "down or, the" should read --down or interrupted--

Column 7, Line 23: "the or interruption" should read --the down or interruption--

Signed and Sealed this

Thirty-first Day of October, 2000

Attest:

Q. TODD DICKINSON

*Attesting Officer*     *Director of Patents and Trademarks*